Jan. 2, 1951 L. J. LARSEN 2,536,554
ANTISKID ATTACHMENT FOR RUBBER TIRED TRACTORS
Filed Nov. 19, 1948

Louis J. Larsen
INVENTOR.

Patented Jan. 2, 1951

2,536,554

UNITED STATES PATENT OFFICE 2,536,554

ANTISKID ATTACHMENT FOR RUBBER TIRED TRACTORS

Louis J. Larsen, Seattle, Wash.

Application November 19, 1948, Serial No. 61,108

1 Claim. (Cl. 152—228)

This invention relates to new and useful improvements in anti-skid attachments for vehicle wheels and the primary object of the present invention is to provide a novel and improved traction attachment for rubber tired tractors that is quickly and readily applied to or removed from a tractor wheel in a convenient manner.

Another important object of the present invention is to provide an anti-skid attachment for vehicle wheels including a pair of complemental, arcuate sections adapted to embrace a tractor wheel and embodying novel and improved means adjustably joining the ends of the sections and facilitating the use of the present invention with vehicle wheels of various diameters.

A further object of the present invention is to provide an anti-skid device so constructed as to grip or bear against opposite sides of a wheel and thereby prevent movement of the device relative to the wheel on which the same is installed.

A still further aim of the present invention is to provide a traction attachment for rubber tired tractors that is simple and practical in construction, strong and reliable in use, small and compact in structure, efficient and durable in operation, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
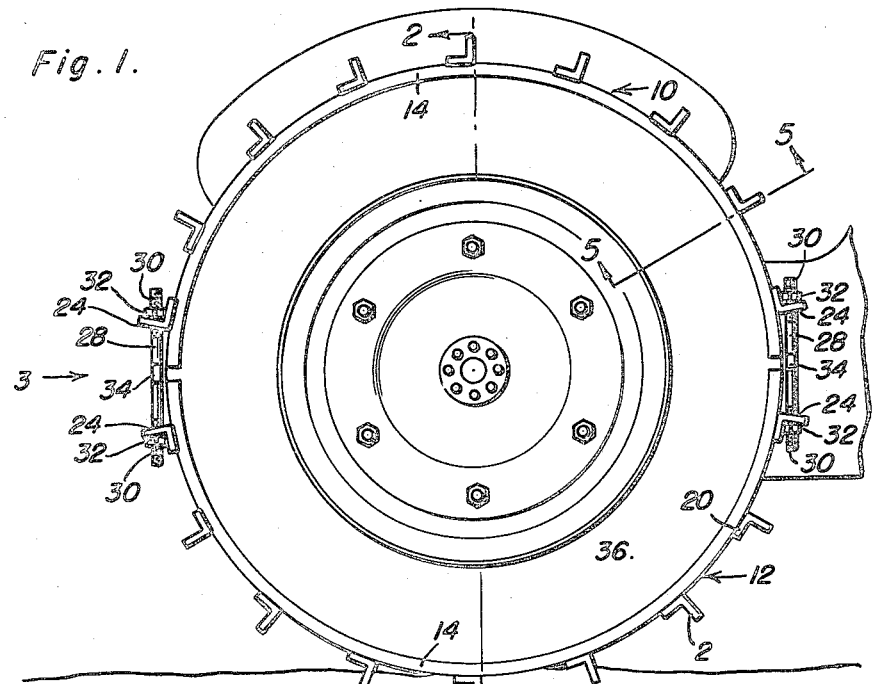
Figure 1 is a fragmentary side elevational view of a tractor and showing the present invention applied to one wheel of the tractor.
Figure 2:
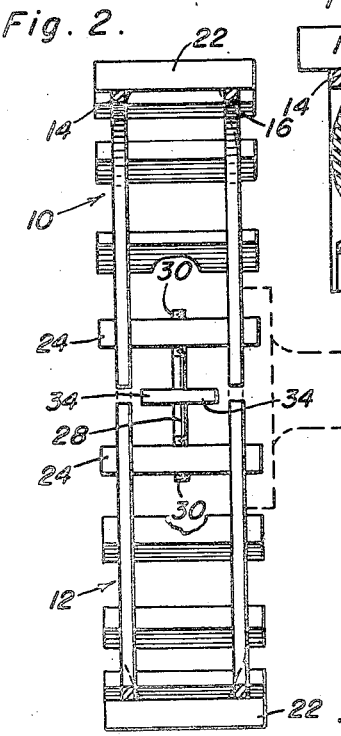
Figure 2 is a vertical sectional view of the present invention taken substantially on the plane of section line 2—2 of Figure 1 and showing the tractor wheel in dotted lines.

Referring now to the drawings in detail, wherein for the purpose of illustration, there is disclosed a preferred embodiment of the present invention, the numerals 10 and 12 represent a pair or complemental semi-circular sections generally each of which includes a pair of spaced parallel arcuate rods or bars 14 and 16.

The bars 14 and 16 are preferably square in cross-section to provide inner flat faces 18 for a purpose which will later be more fully described.

Fixed by welding or the like between the bars 14 and 16 for each of the sections 10 and 12 are the inner legs 20 of a plurality of angle iron cross members or cleats 22. Each of the sections 10 and 12 are provided with a pair of end cleats 24 and the end cleats 24 are provided with central openings 26.

Extending between the end cleats of the section 10 and the end cleats of the section 12, is a pair of bolts 28 having externally threaded ends 30 that are received in the openings 26 and which receivably engage nuts 32 that bear against the end cleats for adjustably connecting the ends of the two sections.

Rigidly secured to or forming an integral part of the bolts 28, is a pair of diametrically opposed lugs or cross members 34 that will bear against the outer periphery of a tire 36 to prevent rotation of the bolts as the nuts 32 are loosened or tightened.

Figure 5:
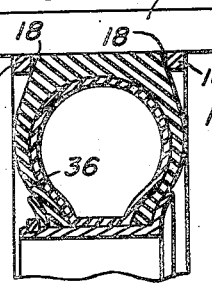
Figure 5 is an enlarged sectional view taken substantially on the plane of section line 5—5 of Figure 1.
Figure 4:
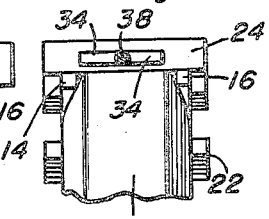
Figure 4 is a transverse horizontal sectional view taken substantially on the plane of section line 4—4 of Figure 3.
Figure 3:
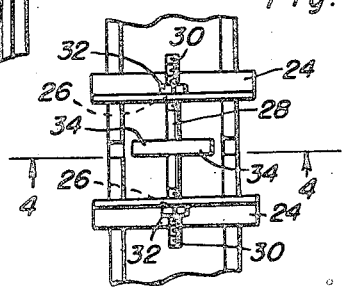
Figure 3 is a fragmentary elevational view taken substantially in the direction of arrow numbered 3 in Figure 1.

It should be noted, that the ends of the cleats 22 and also 24 project outwardly from the bars 14 and 16 and that the inner faces 18 of the bars 14 and 16 bear against opposite sides of the tire 36, as shown best in Figure 5, to prevent movement of the sections 10 and 12 relative to the tire 36.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

An anti-skid attachment for tires comprising a pair of semi-circular sections, each of said sections including a pair of arcuate bars and angle members fixed between said bars, the bars of each pair of bars being spaced to bear against opposite faces of a tire, each of said sections including a pair of end angle members, each of said end angle members having central openings therein, bolts received in the openings and joining the end angle members of one section to the end angle members of the other section, said bolts lying in a plane between planes passing through the bars of each section, and a cross member on each bolt for engaging a tire to prevent rotation of the bolts.

LOUIS J. LARSEN.

REFERENCES CITED

The following references are of record in the file of this patent:

UNITED STATES PATENTS

| Number | Name | Date |
|---|---|---|
| 1,109,699 | Norbury | Sept. 8, 1914 |
| 1,245,095 | Flood | Oct. 30, 1917 |
| 1,438,601 | Kempton | Dec. 12, 1922 |
| 1,642,104 | Delpini | Sept. 13, 1927 |
| 2,262,349 | Webster | Nov. 11, 1941 |
| 2,353,916 | Mickelson | July 18, 1944 |